July 28, 1942.  A. C. HOPKINS  2,291,471
SPOON MOLDING MACHINE AND METHOD
Filed Nov. 26, 1938  6 Sheets-Sheet 1

INVENTOR
ARTHUR C. HOPKINS
BY
Theodore E. Simonton
ATTORNEY

Patented July 28, 1942

2,291,471

UNITED STATES PATENT OFFICE 2,291,471

SPOON MOLDING MACHINE AND METHOD

Arthur C. Hopkins, Tupper Lake, N. Y., assignor to Oval Wood Dish Corporation, Tupper Lake, N. Y., a corporation of Delaware Application November 26, 1938, Serial No. 242,639

26 Claims. (Cl. 144—309)

This invention relates primarily to improvements in spoon molding of the type in which thin, flat wooden blanks cut to the desired shape are subjected to the action of a suitable forming and molding mechanism to press them into conventional spoon shape. These wooden spoon blanks are usually fed to the forming and molding mechanism when in a moist or wet, pliable state caused usually by subjecting the blanks to the action of water. When the moist blanks have been pressed in the conventional manner into spoon shape, an excessively large number of the spoons thus formed become useless and must be discarded owing to the bowls of the spoons checking or splitting as they dry in the molding machine.

The main object of this invention is to provide a method of and a machine for forming and molding thin wooden spoon blanks into conventional spoon shape in such a manner that the spoons, after being removed from the molding mechanism, will remain intact and thereby eliminate much of the excessive waste and expense heretofore experienced in the manufacture thereof owing to the relative large number of rejects.

Another object of the invention is to produce a machine of the above mentioned class which is compact, durable and economical in construction and which is accurate and rapid in operation.

A more specific object of the invention is to produce an improved die operating structure. In carrying out this last mentioned object, I have provided a sectional die member and means for closing said die under yielding pressure by mechanical means including an element having a predetermined stroke of operation.

Furthermore, I have provided simple, efficient means for locking each die member in the closed position irrespective of changes that may occur in the degree of spacing of the die sections while maintaining said die member and the spoon blank under a relatively high degree of temperature. I have also provided a simple mechanism adapted to engage the marginal edge of the bowl portion of the spoon blank during closing of the die for compressing the same to and holding it at substantially its normal size prior to the moistening and swelling of the blank.

The spoon blanks, when in the moist or wet condition ready to be fed to the forming and molding mechanism, are often more or less warped in cross section, and a further object of this invention resides in providing a power operated means for feeding the blanks to the machine under pressure so as to return the blanks to and maintain them in substantially a flat condition.

A still further object of the invention is to provide a simple and efficient branding device which functions in synchronism with the blank feeding means for marking the spoon blanks with a suitable token or insignia.

Other objects and advantages pertaining to the form, relation and operation of the parts of the mechanism will more fully appear from the following description taken in conjunction with the accompanying drawings, in which:

Figure 24 is a detail vertical sectional view through the upper portion of the die carrier housing or oven, taken substantially on line 24—24, Figure 1, illustrating a vent therefor.

Figures 1, 2:
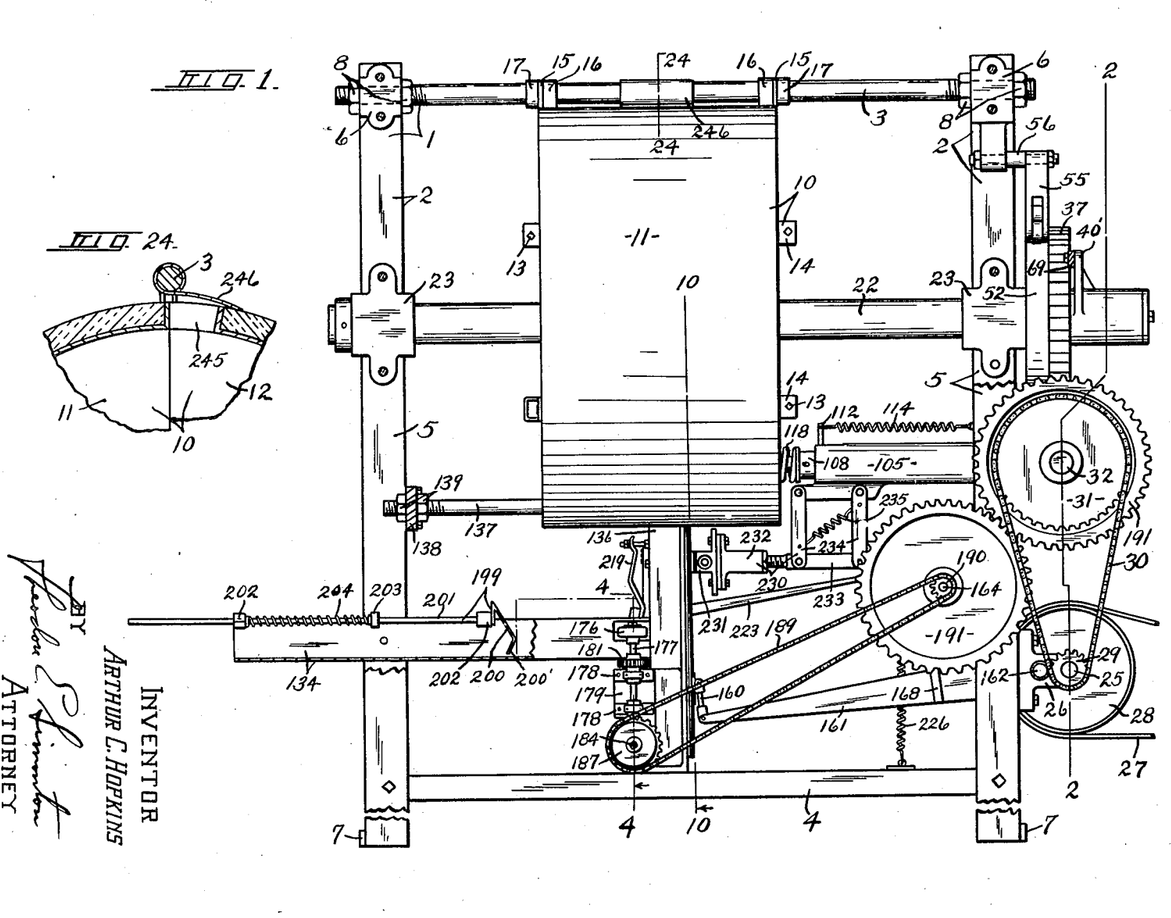
Figure 1 is a side elevation of a spoon molding machine embodying the various features of this invention, certain portions of the machine being broken away and in section.
Figure 2 is a rear end elevation, partly broken away and in section, of the machine shown in Figure 1, taken substantially in the plane of the line 2—2 of said latter figure.

The spoon molding machine illustrated in the drawings comprises a frame 1 composed of opposite end members 2, a cross rod 3 and a pair of cross bars 4. The end members 2 are each composed of a pair of vertically disposed bars 5 arranged in spaced substantially parallel relation with each other, said bars being tied together at their upper end by a spacing block 6 and at their lower end by a tie bar 7 extending transversely of said bars. The cross rod 3 extends longitudinally of the frame at the upper end thereof, the ends of said rod being screw-threaded in the spacing blocks 6. Nuts 8 may be screw-threaded on the cross rod 3, as shown in Figure 1, at opposite sides of the corresponding spacing block 6 for locking the cross rod to the end members 5.

Figure 6:
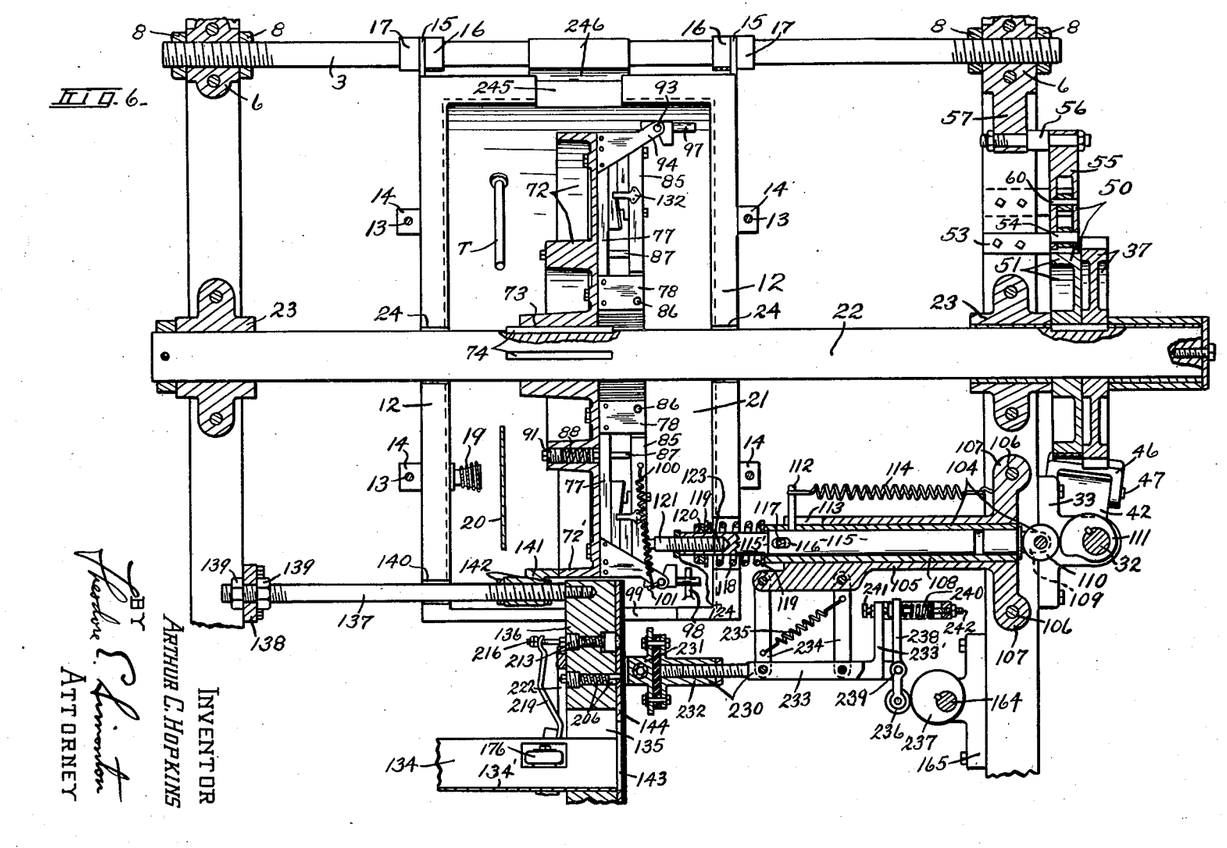
Figure 6 is a longitudinal vertical sectional view taken substantially on line 6—6, Figure 2.

A cylindrical housing or oven 10 is mounted in the frame 1 intermediate the end members 2. This housing or oven 10 is composed of two substantially equal sections 11 and 12 which are secured together by bolts 13 passing through suitable lugs 14 secured to the sections at their adjacent sides, as illustrated in Figures 1 and 6. The housing or oven is supported by the cross rod 3 of the frame 1 by means of a pair of ears 15 secured to the upper portion of the housing section 12, as shown in Figure 6, and a pair of ears 16 secured to the upper portion of the housing section 11. These ears 15 and 16 are rotatably mounted on the cross rod 3 between a pair of collars 17 secured to said cross rod so that the housing sections may swing about said cross rod toward and from each other when the bolts 13 are removed from the lugs 14.

The interior of the housing or oven 10 may be heated by any suitable means as by a plurality of electrical heating elements, one of which is illustrated at 19, Figure 6. A baffle plate 20 is preferably extended across the inner chamber, as 21, of the housing or oven adjacent the heating elements 19 for deflecting the heating rays produced by the heating elements laterally so as to maintain the chamber 21 at a substantially uniform temperature throughout the entire area thereof and to protect the die mechanism, presently described, mounted within the chamber and which is positioned adjacent the heating elements from the heat produced by said elements. Any suitable means may be employed for connecting the heating elements with a source of potential (not shown).

Extending through the housing or oven 10 substantially coaxially therewith is a substantially horizontally disposed shaft 22 which is journaled in suitable bearing members 23 secured to the end members 2 of the frame 1 in a plane below the spacing blocks 6. The housing or oven 10 is provided with suitable apertures 24 in the end walls thereof loosely receiving the shaft 22 therethrough. These apertures 24 are preferably formed by recessing adjacent surfaces of the sections 11 and 12 so that one or both of said sections may freely swing toward and from the other independently of the shaft.

The shaft 22 may be rotated by any suitable indexing means, as from a drive shaft 25, journaled in suitable bearings 26 secured to the rear end member 2 of the frame 1 beneath the shaft 22. The shaft 25 may be rotated by any suitable means, as by a belt 27, connected with any suitable source of power (not shown) and a pulley 28 secured to the shaft 25, as shown in Figure 1. The shaft 25 is operatively connected with the shaft 22 by means of a sprocket gear 29 mounted on the shaft 25 and connected by a chain belt 30 to a sprocket wheel 31 secured to an eccentric shaft 32 journaled in suitable bearings 33 secured to the frame 1 intermediate the shaft 22 and drive shaft 25. The shaft 32 has one end thereof offset to provide an eccentric 34 which is operatively connected with the shaft 22 by a ratchet and pawl mechanism 35 mounted on the shaft 22, and a linkage mechanism 36 journaled on the eccentric 34 and operatively connected with the ratchet and pawl mechanism 35, as shown in Figure 2. The ratchet wheel 37 of the ratchet and pawl mechanism 35 is keyed to the shaft 22, as illustrated in Figure 6, while the pawl as 38 is pivotally mounted, as at 39, to one end of a rock arm 40 rotatably mounted on the shaft 22 adjacent the outer side of the ratchet 37. The linkage mechanism 36, in this instance, comprises a pair of head members 41 and 42, one of which, as 41, is pivotally connected by a pin 43 to a pendent portion 38' of the pawl 38. The other one of the head members, as 42, is provided with a roller bearing member 44 mounted upon the eccentric 34.

The head members 41 and 42 are adjustably secured to each other by a bolt 45 which has one end thereof in screw-threaded engagement with the head 41 and the other end in screw-threaded engagement with a yoke 46 which in turn is pivotally connected by a pin 47 to the head 42.

A pair of lock nuts 48, screw-threaded on the bolt 45, are provided for securing the bolt in the adjusted position with respect to the head 41 and yoke 46. The pivotal pins 43 and 47 are arranged in right angular relation with respect to each other so as to permit the linkage mechanism to swing about the pin 43 during the rotation of the eccentric 34 and to swing about the pin 47 as the latch 38 pivots about the pin 39 during the movement of said latch into and out of holding engagement with the ratchet wheel 37.

It will now be observed that during the rotation of the eccentric shaft 32, the shaft 22 will be intermittently rotated, the amount of rotation of shaft 22 for such rotation of the eccentric shaft 32 depending upon the amount of throw of the linkage mechanism 45 produced by the eccentric 34 or, in other words, on the amount of eccentricity of the eccentric 34.

Figures 2, 3, 4, 5:
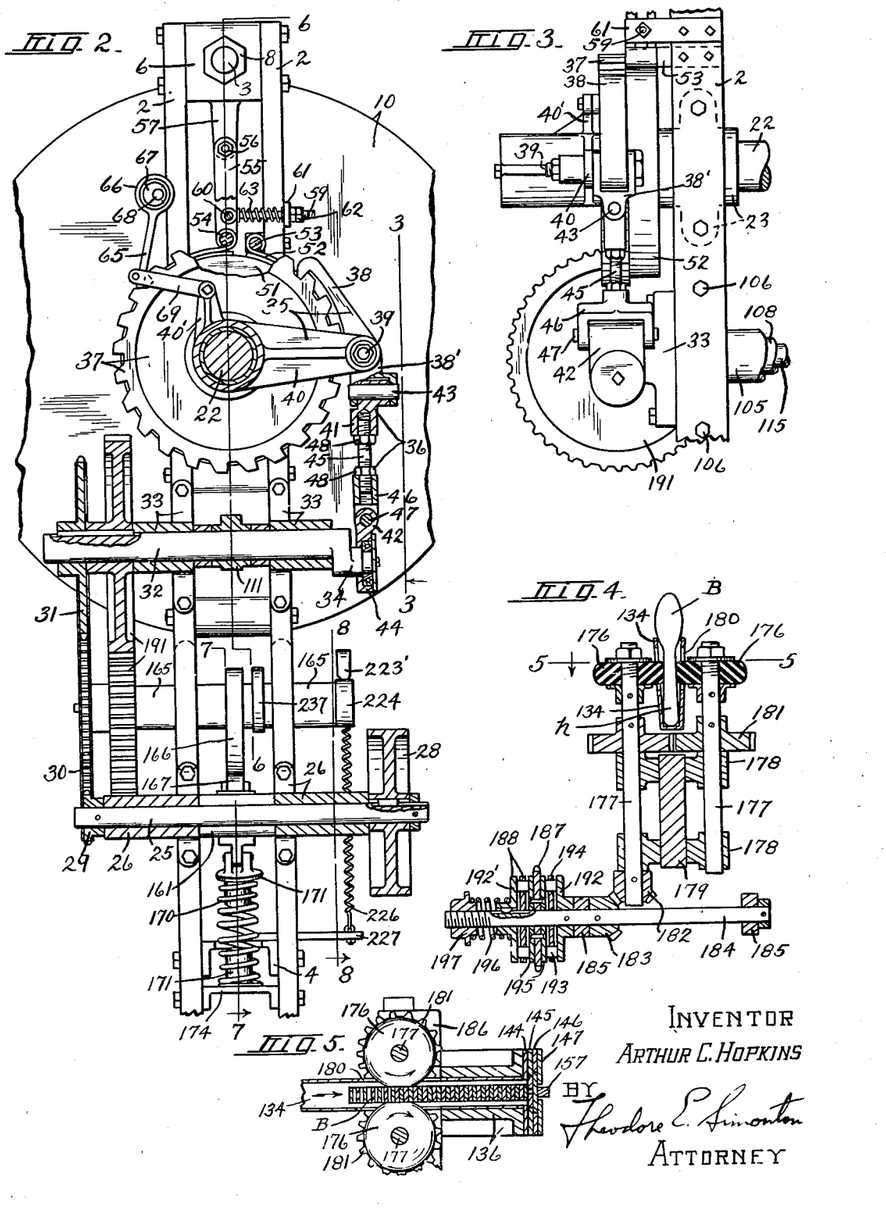
Figure 3 is a detail side elevation showing a portion of the intermittent indexing mechanism for the die carrier as viewed from the plane indicated by the line 3—3, Figure 2.
Figure 4 is a detail vertical sectional view through the power driven feed mechanism taken substantially on line 4—4, Figure 1.
Figure 5 is a detail horizontal sectional view taken on the line 5—5, Figure 4.

The shaft 22 is maintained against rotation during the movement of the latch 38 from engagement with one tooth of the ratchet wheel 37 into engagement with another tooth thereof by means of a drag mechanism 50. This drag mechanism comprises a brake drum 51 secured to the shaft 22 intermediate the ratchet wheel 37 and the adjacent bearing 23, as shown in Figure 6, and a brake band 52 mounted on the brake drum 51. One end of the brake band 52 is fixedly secured to the frame 1 by means of a pin 53 connected with said end of the brake drum and with the adjacent end member 2 of the frame 1, as shown in Figure 3. The other end of the brake band 52 is connected by a pin 54 with the bifurcated end of a rock arm 55 pivotally connected by a pin 56 to a pendent lug 57 secured to or made integral with the adjacent spacing block 6 of the frame 1, as shown in Figures 1, 2 and 6.

The brake band 52 is yieldingly maintained in frictional engagement with the brake drum 51 by means of an adjusting screw 59 pivotally connected, as at 60, with the arm 55 and which passes through an aperture in plate 61 secured to the adjacent end member of the frame 1. Nuts 62, screw-threaded on the outer end of the screw member 59, are adapted to engage the plate 61 for drawing the arm 55 toward the brake pin 53 and maintain the brake band 52 in frictional engagement with the brake drum 51. A spring 63 may be mounted on the screw member 59 between the plate 61 and arm 55 for moving the brake band out of frictional engagement with the brake drum when the nuts 62 are screw-threaded outwardly toward the free end of the member 59.

A stop arm 65 cooperates with the pawl 38 for positively holding the shaft 22 in a predetermined position during each feeding operation of the ratchet and pawl mechanism 35. This stop arm 65 has one end thereof provided with an eccentric strap 66 rotatably mounted on an eccentric sleeve 67 secured to a pin 68 which in turn is connected with the adjacent end member 2 of the frame 1, as shown in Figure 2. The lower end of the stop arm 65 is moved into and out of engagement with a tooth of the ratchet wheel 37 during the operation of the pawl 38 and arm 40 by means of a link 69 pivotally connected with the lower end of the arm 65 and with an upwardly projecting arm member 40' connected with the arm 40, as indicated in Figure 2.

It will now be observed that during upward movement of the arm 40 to bring the pawl 38 from engagement with one tooth of the ratchet wheel 37 into engagement with the next adjacent tooth thereof, the lower end of the stop arm 65 will be moved out of engagement with the ratchet wheel 37 by rocking movement of the extension 40' through the medium of link 69. As the ratchet wheel is rotated by action of the pawl 38 during the downward movement of said pawl, the stop arm 65 will again swing into engagement with a tooth of the ratchet wheel as the pawl 38 approaches its lowermost portion and cooperates with said pawl for positively holding the ratchet wheel against vibratory movement when the pawl is in its lowermost position. The stop arm 65 may be adjusted to effect longitudinal movement thereof by rotation of the eccentric sleeve 67 on the pin 68 to bring the lower end of the stop arm into proper holding relation with a tooth of the ratchet wheel.

Figures 10, 11, 12, 13, 14, 15:
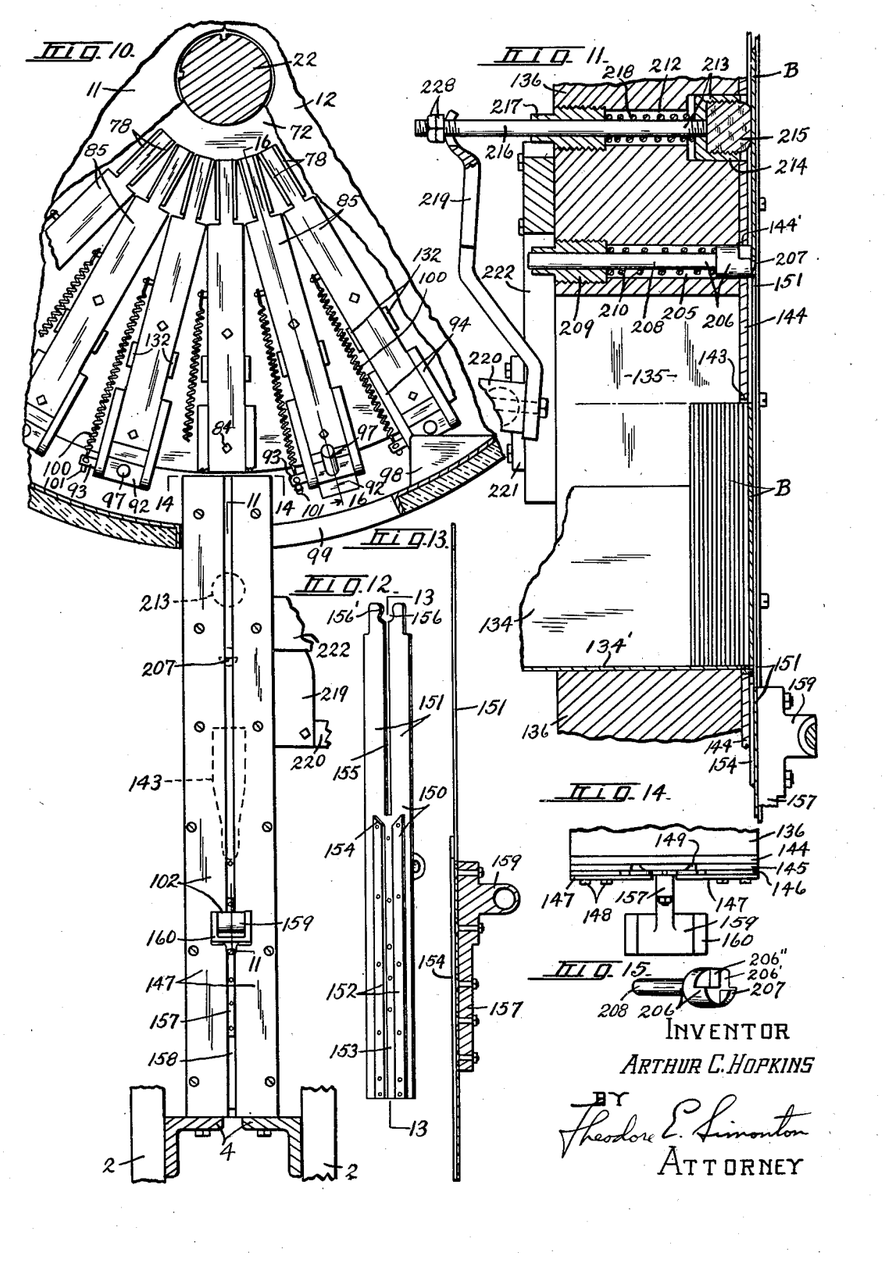
Figure 10 is a detail vertical sectional view taken substantially on line 10—10, Figure 1, illustrating a portion of the blank feed mechanism and the adjacent portion of the die carrier on an enlarged scale.
Figure 11 is an enlarged detail vertical sectional view taken substantially on line 11—11, Figure 10.
Figure 12 is a perspective view of the spoon blank feed slide.
Figure 13 is an enlarged vertical sectional view of the feed slide taken on line 13—13, Figure 12.
Figure 14 is a detail plan view illustrating the upper end of the spoon blank feed standard as viewed from line 14—14, Figure 10.
Figure 15 is a perspective view of a latch member for maintaining the spoon blank in an intermediate elevated position during the retraction of the feed slide.

Mounted upon the shaft 22 and positioned within the oven 10 is a die carrier 72 which, as illustrated in Figures 6 and 10, is a circular flanged plate provided with a hub 73 at the center to permit the shaft 22 to pass therethrough. The carrier 72 may be secured to the shaft 22 in any suitable manner, as by keys 74, to cause said carrier to rotate in unison with the shaft. Mounted upon one side surface of the carrier 72 in substantially uniform circumferential spaced relation to each other is a plurality of, in this instance twenty-four, die supporting brackets 75, each of which, as illustrated in Figure 16, is secured to the carrier 72 by a pair of screws 76.

Each bracket 75 consists of a substantially rectangular base plate 77 arranged substantially radially with respect to the carrier 72 and a pair of outwardly projecting arms 78 secured to or formed integral with the upper end of the plate or base 77 and arranged in spaced substantially parallel relation with each other. Each bracket 75 supports a spoon molding die 80 which, as shown more particularly in Figure 16, comprises a female die section 81 secured to the lower end portion of the base 77 by screws 82, and a male die section 83 secured by screws 84 to the outer end portion of a rock arm 85, the arm 85 being pivotally secured at its inner end to the arms 78 by a pin 86. The male die section 83 is normally maintained in an outer position in spaced relation to the corresponding female die section 81 by means of a spring-pressed plunger 87 mounted in a suitable recess provided in the base 77 adjacent the arms 78 and which has the outer end thereof engaging the corresponding arm 85. The spring, as 88, for actuating the plunger 87 is mounted in a bore 89 provided in an annular flange 90 on the carrier 72. The spring 88 has the outer end thereof in engagement with a plug 91 screw-threaded in the bore 89 so that the tension of said spring may be increased or decreased by adjustment of the plug.

The position of the male die 83 with respect to the female die 81 is controlled by a keeper 92 pivotally connected by a pin 93 to the outer ends of a pair of bearing arms 94 secured to or made integral with the outer end portion of the corresponding bracket base 77. These bearing arms 94 are arranged to extend outwardly at opposite sides of the corresponding rock arm 85 in substantially parallel relation with each other.

Figures 16, 17, 18, 19, 20, 21, 22:
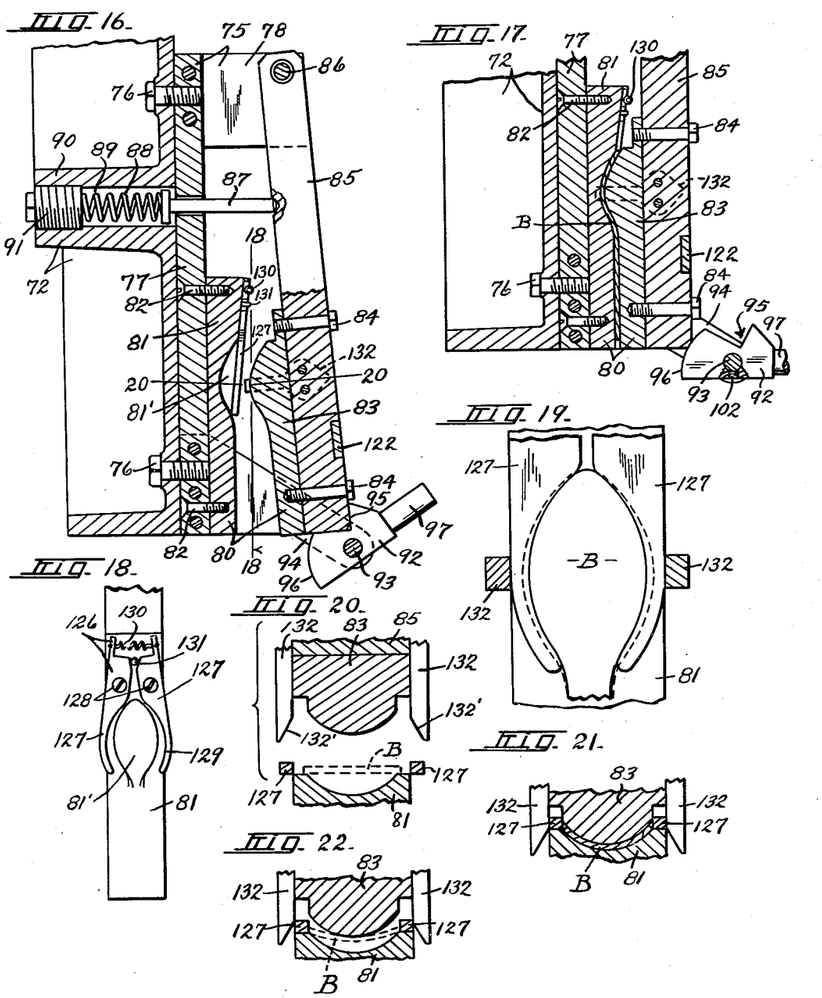
Figure 16 is an enlarged detail longitudinal sectional view through one of the spoon blank molding die members taken substantially on line 16—16, Figure 10, the die member being shown in the open position.
Figure 17 is a detail vertical sectional view of the lower portion of the die shown in Figure 16, illustrating said die locked in the closed position.
Figure 18 is a detail face view of the female section of the die shown in Figures 16 and 17, as viewed from line 18—18, Figure 16.
Figure 19 is an enlarged face view of an intermediate portion of the female die member illustrated in Figure 18 with the bowl portion of a spoon blank associated therewith, the spoon blank being illustrated in its normal swelled or expanded condition by broken lines and by full lines when compressed by the clamping jaw members to substantially its normal form prior to the moistening operation.
Figures 20, 21 and 22 are horizontal sectional views through the die member taken substantially on line 20—20, Figure 16, illustrating successive positions of the members of the die in moving from the open position to the closed position.
Figure 23:
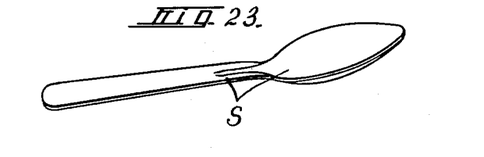
Figure 23 is a perspective view of a wooden spoon formed in the machine of this invention.

Each keeper 92 is provided with a substantially right angle recess 95 in one side thereof adapted, when the keeper is in one position, to receive the lower end portion of the corresponding arm 85 therein, as illustrated in Figure 16. Each keeper 92 is also provided with a cam surface 96 which extends from the recess 95 across one end thereof in eccentric relation to the pin 93 for contacting the adjacent end edge of the arm 85 when said arm is moved to its innermost position, as illustrated in Figure 17, and maintaining the male die section 83 carried by the arm in cooperative relation with the corresponding female die section 81 when a spoon blank is being molded. Each keeper 92 is also provided with an operating pin 97 which extends substantially radially from the end thereof opposite the cam 96. This pin is arranged to be engaged by a cam member 98 secured to the housing or oven 10 at the inner side thereof for moving said keeper from its locking position shown in Figure 17 where the arm 85 is held thereby in its innermost position to the cocked position shown in Figure 16 where said arm 85 is maintained in its outer position.

The cam member 98 is secured to the inner side of the oven 10 near the bottom thereof and adjacent the rear side of a discharge opening 99 formed in the peripheral wall of the oven, as shown in Figure 10, for effecting opening of the die member and the release of a formed spoon in a manner which will hereinafter be more fully explained.

Each keeper 92 is yieldingly urged to rotate about its pin 93 in a direction to bring the cam surface 96 thereof into operative engagement with the corresponding arm 85 by means of a coil spring 100 secured at one end to the corresponding arm 85 in spaced relation to the pivotal end thereof, see Figure 6, and to a pin 101 secured to one end of the pivotal pin 93 which is extended beyond the adjacent arm member 94, as illustrated in Figure 10, it being understood that each keeper 92 is secured to its corresponding pivotal pin 93 by a screw 102, as shown in Figure 17, so as to rotate with said pivotal pin.

While each spring 100 is adapted to rotate its keeper 92 to maintain the cam 96 of said keeper in contact with the corresponding arm 85 as said arm is moved toward the base 77, said spring is not of sufficient strength to cause the cam 96 to effect movement of the arm 85 inwardly against the action of the spring pressed plunger 87.

It will now be observed, by referring to Figures 2 and 10, that there are the same number of teeth in the sprocket wheel 37 as there are die members 80 provided on the carrier 72. These die members and teeth are so arranged with respect to each other that when the pawl 38 is in its lowermost position a die member 80 will be positioned beneath the shaft 22 in substantially the vertical plane passing through the axis of said shaft and over the forward end portion of the opening 99 for receiving a spoon blank, as B, Figure 4, therein which blank may be fed to said die by a suitable feed mechanism 102 presently described.

It will also be observed by referring to Figure 10 that the die 80, when initially moved to the vertical or loading position, will be open due to the coaction of plunger 87 and keeper 92 as the arm 97 of the keeper is moved over the cam 98. In other words, the engagement of a pin 97 with the cam 98 during intermittent rotation of the die carrier 72 will swing the corresponding keeper from the locking position where it maintains the male die section in its innermost position in operative relation with the corresponding female die, as shown in Figure 16, to the cocked position where the free end of the corresponding arm 85 registers in the keeper recess 95. This registration of the arm 85 in the recess 95 maintains the keeper in its cocked position against being rotated to its locked position by the action of the spring 100 so that as the die member moves from a position at the rear of the opening 99 to the loading station in registration with the forward end portion of said opening, the die members will be in their open position for receiving a spoon blank therein.

After the spoon blank has been fed into the die member positioned at the loading station, the male die section 83 is moved toward the corresponding female die section 81 for closing the die by means of a die-closing mechanism 104. This die-closing mechanism 104 comprises a tubular housing member 105 which is secured to the rear end member 2 of the frame 1 by means of bolts 106 passing through aligned holes provided in the end bars 5 and laterally projecting lugs 107 provided on the housing 105 at one end thereof, as shown in Figure 6.

Slidably mounted in the housing 105 is a bearing sleeve 108 which has secured to the outer end thereof a yoke 109 which rotatably supports a cam follower 110. This cam follower is adapted to engage the peripheral surface of a cam 111 secured to the eccentric shaft 32 intermediate the bearings 33, as illustrated in Figures 2 and 6. The sleeve 108 extends through the housing 105 and has secured to the inner or forward end thereof a pin 112 which extends upwardly therefrom and loosely passes through an elongated slot 113 provided in the inner end of the housing 105 so as to maintain the sleeve and housing against relative rotary movement.

To the outer end of the pin 112 is secured a spring 114 which has the other end thereof connected with the upper lug 107 of the housing 105 for yieldingly urging the sleeve 108 outwardly or in a direction toward the cam 111 and thus maintain the cam follower 110 in engagement with the cam 111. A plunger 115 is slidably mounted in the sleeve 108 for longitudinal reciprocative movement with respect thereto. The plunger 115 is provided with an elongated slot 116 which receives therethrough a stop pin 117 secured to the sleeve 108 adjacent the inner end thereof for maintaining the plunger against rotary movement and also for limiting the axial movement of said plunger with respect to the sleeve. The plunger 115 has the inner end portion 115′ thereof slightly reduced in diameter and carries a spring 118 positioned between a washer 119 mounted on the reduced end portion 115′ adjacent nuts 120 screw-threaded on said reduced end portion, and the inner or forward end of the sleeve 108.

The plunger 115 is provided with an extension 121 adapted to engage a hardened bearing plate 122 provided on each rock arm 85 in position to align with the plunger 115 when the corresponding die 80 is moved to the loading station. The extension 121 is mounted in a centrally disposed opening 123 provided in the forward end of the plunger 115 in screw-threaded engagement therewith so as to be adjusted axially with respect to the plunger 115 for bringing the forward end of the extension into proper engagement with the bearing plate 122 when the plunger 115 is moved to its innermost position. The extension 121 may be secured in the adjusted position by a nut 124 screw-threaded on said extension for engagement with the forward end of the plunger 115.

It will now be observed that the relation of the pin 117 and slot 116 and extension 121 are such that when the sleeve is moved by the cam 111 to its innermost position, the plunger extension 121 will be moved through the coaction of sleeve 108 and spring 118 into engagement with an arm 85 adjacent thereto for yieldingly urging the male die section connected with said arm to the closed position. The parts are shown in Figure 6 with the high point of the cam 111 in engagement with the cam roller 110, the sleeve 108 in its extreme forward position, and the plunger extension 121 in contact with the arm 85, the die having just been closed. It will be observed from Figure 6 that the pin 117 is near the center of its slot 116, and that the only driving connection between the sleeve 108 and the plunger extension 121 is through the spring 118.

Just prior to the feeding of the spoon blanks which are composed of thin, flat wood stamped or cut into spoon shape, as indicated on a small scale at B, Figure 4, the blanks are subjected to the action of moisture thereon to render the same soft and pliant so as to be readily molded into the conventional spoon contour. When the spoon blanks B are thus treated with moisture they, of course, expand, particularly at the bowl portion of the blank which is somewhat greater in cross sectional area than the handle portion thereof.

Associated with each die member 80 is a blank compressor unit 126 which is adapted to compress the temporarily expanded bowl portion of the spoon to substantially its normal width during the time the bowl portion of the blank is operated upon by the die sections 81 and 83 to mold the same into the usual spoon bowl of concavo-convex cross section. Each of these blank compressor units 126 comprises a pair of clamping jaw members 127 which are pivotally secured in opposed relation to each other to the female section 81 of the die by shouldered screws 128 which have screw-threaded engagement with the die section at the inner side of the die cavity 81', as shown in Figure 18.

The screws 128 are arranged intermediate the ends of the jaw members and the jaw members have the inner adjacent surfaces thereof provided with opposed recesses 129 conforming in contour substantially to that of the peripheral surface of the bowl portion of the spoon blank. These recesses 129 are arranged in aligned relation with the die cavity 81' for receiving the bowl portion of the spoon blank therein when said portion of the blank is in registration with the die cavity. The opposite or inner end portions of the jaws extend some distance beyond the pivotal screws 128 and are connected by a coil spring 130 which normally urges these ends of the jaw members toward each other for maintaining the opposite end portions in spaced relation to each other.

A stop pin, as 131, may, as shown in Figure 18, be connected with the die section 81 intermediate the inner ends of the jaw members for limiting the relative movement of said jaw members produced by the spring 130 and to also maintain the jaw members in symmetrical relation with the die cavity when said members are in the open position. The jaw members 127 are normally maintained in such spaced relation to each other when in the open position as to readily permit the bowl portion of the spoon blank to enter the recesses 129, as the blank is moved into cooperative relation with the die sections 81 and 83.

The jaws 127 are moved toward each other into clamping engagement with the bowl portion of the spoon blank, as the die 80 is being closed, by a pair of arms 132 secured, as illustrated in Figures 16 and 17, to opposite sides of the corresponding rock arm 85. These arms 132 extend inwardly from the arm 85 along adjacent sides of the male die section 83 in substantially the plane passing transversely through the die cavity 81' midway between the ends of said cavity. The inner or free ends of the arms 132 are tapered, as at 132', to provide cam surfaces for engaging the outer edges of jaw member 127 and urging the jaw members to their innermost positions against the action of spring 130 for compressing the swollen bowl portion of the spoon blank to substantially its normal width.

The hereinbefore mentioned mechanism 102 for feeding the spoon blanks B into operative relation with successive die members 80 comprises a substantially horizontally disposed chute or magazine 134 which is secured to the forward end member 2 of the frame 1 below the shaft 22. This chute or magazine 134 is substantially U-shaped in cross section and is adapted to receive the handle portions h of the spoon blanks therein when said blanks are maintained in substantially a vertical position, as indicated in Figures 1 and 4.

The forward end of the chute or magazine 134 terminates in an opening 135 provided in a standard 136 mounted upon the cross bars 4 beneath the oven 10, as shown in Figures 1 and 10. The upper end of the standard 136 extends through the forward portion of opening 99 provided in the wall of the oven and terminates in close proximity to the carrier 72 to register with adjacent ends of the die members 80 mounted on said carrier. The upper end of the standard is secured to a tie rod 137 which in turn is secured to the frame 1 by a cross bar 138 and nuts 139, as shown in Figure 6. The rod 137 is disposed in substantially a horizontal plane and extends through an opening formed by recesses 140 provided in adjacent surfaces of the end walls of the housing sections 11 and 12, as indicated in Figure 6.

An anvil 141 is screw-threaded on the tie rod 137 adjacent the standard 136 and is adjustably clamped to said rod by nuts 142 screw-threaded on the rod 137 at opposite sides of the anvil. The anvil 141 is adapted to slidably contact the lower side of a marginal flange 72' provided on the carrier or plate 72 for absorbing the thrust of the plunger 115 during the closing of the die 80 positioned at the loading station.

The inner end of the magazine 134 terminates in substantially the plane of the inner side of the standard 136 in registration with a recess 143 provided in a guide plate 144 secured to said standard at said side. The guide plate extends from the upper end of the standard downwardly to substantially the lower end thereof and has secured to its outer face two pairs of spacing plates 145 and 146.

The plates of each pair are arranged in substantially parallel relation to each other adjacent corresponding longitudinal edges of the guide plate 144. The plates 145 are of greater width than the plates 146 and are arranged adjacent the guide plate 144, as illustrated in Figure 14. Positioned adjacent the outer faces of the spacing plates 146 are a pair of gib plates 147. The guide plate 144, spacing plates 145 and 146 and the gib plates 147 are secured to the standard 136 by screws 148 so as to produce a T-shaped guide recess or way 149 for receiving a feed slide 150.

Feed slide 150, as shown more particularly in Figures 12 and 13, comprises a thin, flexible plate 151 composed preferably of spring steel and which is adapted to be slidably received in the head or wider portion of the recess 149 and a pair of cleats 152 which are secured to the lower half portion of the plate 151 in substantially parallel spaced relation to each other so as to provide a groove or channel 153 between them. The cleats 152 are arranged in such spaced relation to the adjacent longitudinal edges of the plate 151 that they are adapted to be slidably received in the narrower portion of the recess 149. The upper ends of the cleats 152 are preferably beveled in opposite directions from their inner adjacent edges, as at 154, to form a seat for the outer end of the handle portion of a spoon blank.

The feed plate 151 is provided with a centrally disposed longitudinally extending slot 155 which extends from in close proximity to the seat 154 to a circular recess 156 provided in the upper end of the plate 151. The recess 156 is adapted to receive the free end of the handle portion of a spoon blank therein and is provided with a contracted throat portion 156' at the outer end thereof of slightly less width than that of the handle portion of the spoon blank so that when the end of the handle portion of the blank is inserted in the recess, said blank will be gripped in the throat 156' and thereby releasably secured to the plate 151 so as to be moved in unison with said plate.

Figure 7:
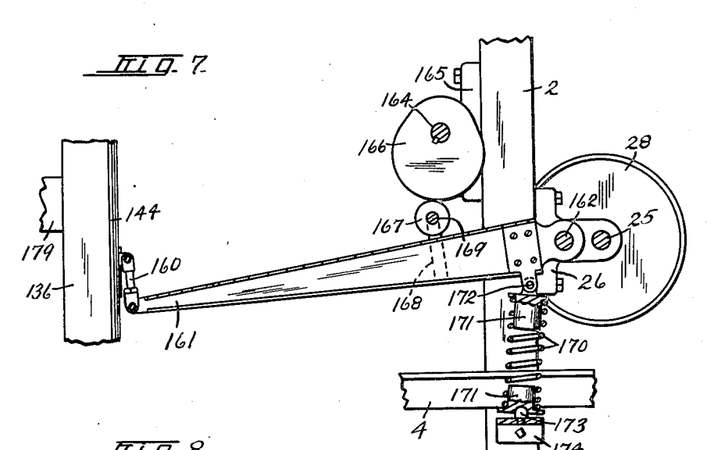
Figures 7 and 8 are detail vertical sectional views taken, respectively, on lines 7—7 and 8—8, Figure 2.

The side of the plate 151 opposite the cleats 152 is provided with a relatively long narrow bracket 157 which is adapted to be received in the longitudinal slot 158 which extends longitudinally of the standard 136 between the gib plates 147. This bracket 157 is provided with an outwardly extending apertured boss 159 to which is pivotally secured one end of a link 160 which has the other end thereof pivotally connected to the free end of a rock arm 161, as illustrated in Figures 1, 7 and 14. The rock arm 161 has the other end thereof positioned between the bearing members 26 for the shaft 25, as illustrated in Figures 2 and 7, and pivotally connected to said bearing members by a pin 162.

Mounted over the arm 161 at the inner side of the rear end member 2 of the frame 1 is a cam shaft 164 which is journaled in suitable bearings 165 secured to the end bars 5 of said end member. Upon the shaft 164 is a cam 166 which is mounted over the arm 161 for engagement with a cam follower 167 rotatably connected by straps 168 and pin 169 to the arm 161. The arm 161 is urged upwardly about the pivot 162 for maintaining the cam follower 167 in contact with the peripheral surface of the cam 166 by a spring 170 which is mounted between a pair of heads 171, one of said heads being pivotally connected, as at 172, to the arm 161 intermediate the cam follower 167 and pivotal pin 162. The other head 171 is rotatably mounted on a stud 173 connected with the adjacent end member of the frame 1 by a bracket 174.

It will now be observed that during rotation of the cam 166 arm 161 will rock about its pivot 162 by the cooperation of said cam and the spring 170 for reciprocating the feed slide 150 in the guide recess 149. The relation of the cam 166, arm 161 and boss 159 is such that when the arm, and therefore the feed slide 150, is in the lowermost position the seat 154 will be positioned in substantial alignment with or slightly below the bottom 134' of the chute or magazine 134, as illustrated in Figures 6 and 11. It therefore follows that the upper end portion of the feed plate 151 will extend a corresponding distance above the bottom 134' of the feed chute.

As hereinbefore indicated, the spoon blanks B are placed in the chute 134 with the handle portion of the blanks arranged lowermost. The chute 134 is provided with a pair of feed rollers 176 which are secured to vertically disposed spindles 177 arranged at opposite sides of the chute, as illustrated in Figure 4, and journaled in suitable bearings 178 secured to a bracket 179 carried by the standard 136 as indicated in Figure 1. The feed rollers 176 extend through corresponding apertures 180 provided in the sides of the chute 134 to engage the handle portions of the spoon blanks and are rotated in unison by a pair of gears 181 mounted on the spindles 177 in meshing engagement with each other and a bevel gear 182 mounted on the lower end of one of the spindles 177 in meshing engagement with a similar bevel gear 183 secured to a drive shaft 184. The shaft 184 is rotatably mounted in a pair of axially spaced bearings 185 connected with a bracket 186 secured to the standard 136, as shown in Figure 5. Shaft 184 is driven by a sprocket wheel 187 rotatably mounted on the shaft and operatively connected therewith by a friction clutch mechanism 188. The sprocket wheel 187 is connected by a chain belt 189 with a sprocket gear 190 which in turn is secured to the cam shaft 164, said cam shaft being driven from the eccentric shaft 32 by means of a pair of intermeshing gears 191 secured one to the shaft 32 and the other to the shaft 164.

The friction clutch 188, in this instance, comprises a pair of friction plates 192 and 192' mounted upon the shaft 184 at opposite sides of the sprocket wheel 187, one of said plates, as 192, being fixedly secured to the shaft and the other plate 192' being splined to said shaft so as to move axially with respect thereto. Mounted intermediate the friction plates 192 and the sprocket wheel 187 are two series of friction members 193, each of the series of friction members being supported by a retaining plate 194 mounted on the shaft 184 intermediate the corresponding friction plate 192 and the sprocket wheel 187. The sprocket wheel 187 may, as illustrated in Figure 4, be provided with a pair of friction plates 195 secured to opposite sides thereof to be engaged by the corresponding series of friction members 193. The friction members 193 are yieldingly urged into frictional contact with the friction plates 192 and 195 by means of a spring 196 mounted on the shaft 184 intermediate the friction plate 192' and a collar 197 mounted on the outer end of the shaft 184. The collar 197 may be screw-threaded on said shaft, as shown, to permit adjustment thereof with respect to the shaft for varying the tension of the spring 196.

The feed rollers 176 are preferably composed of rubber or other resilient material and are so spaced with respect to each other as to frictionally receive the handle ends of the spoon blanks between them. After the spoon blanks have been subjected to the action of moisture, as hereinbefore mentioned, prior to the feeding of the spoons to the machine, they often become warped, and the feed rollers 176 and friction clutch 188 are so arranged that they will feed the spoon blanks forwardly through the chute 134 and crowd them into such pressure engagement with the feed slide 150 as to return the blanks from their warped condition to a flat condition.

The chute or magazine 134 is also provided with a spring pressed plunger 199 arranged at the outer side of the feed rollers 176. This plunger 199 comprises a head 200 secured to one end of a rod or stem 201 which is slidably supported in a pair of bearings 202 connected with the outer end of the chute 134. The stem 201 is provided with a collar 203 secured thereto intermediate the bearings 202 and a compression spring 204 is mounted on the stem intermediate the collar 203 and one of said bearings for urging the head inwardly toward the feed rollers 176.

The head 200 comprises a spring plate 200' which extends downwardly from the stem 201 into the chute 134 at an inclination to the axis of the stem for supporting the spoon blanks and urging them toward the feed rollers 176 as said blanks are positioned in the chute intermediate said head and feed rollers.

As shown in Figure 11, the standard 136 is provided with a bore 205 arranged above the opening 135. In this bore is slidably mounted a spoon blank retaining member or head 206 having a projection or latch 207 which extends from the forward end 206' thereof through a suitable aperture 144' provided in the guide plate 144 in alignment with the bore 205 and into the guide recess 149 for the feed slide 150. The latch 207 is adapted to be received in slot 155 adjacent recess 156 provided at the upper end of the feed slide 150 when said slide is in its lowermost position. The latch 207 is of such a width as to readily travel through the slot 155 as the feed plate 151 is moved upwardly during the feeding of a blank from the chute 134 toward the oven 10.

The retaining head 206 is provided with a stem 208 which is slidably supported in a plug 209 screw-threaded in the outer end of the bore 205. A spring 210 is mounted on the stem 208 intermediate the plug 209 and a head 206 for urging said latch to its normal foremost position with shoulders 207' provided on said head in contact with plate 144.

The standard 136 is provided with a second bore 212 which extends therethrough in a plane above the bore 205 in substantially parallel relation therewith. In the bore 212 is mounted a brake member 213 which, in this instance, comprises a cup-shaped case 214 provided with internal threads with which a brake shoe 215 composed of cork or other suitable resilient material is mounted so as to project inwardly a short distance beyond the case into the guide recess 149 for the feed slide 150. The case 214 is provided with a stem 216 which extends outwardly through a plug 217 screw-threaded in the outer end of the bore 212.

Figure 9:
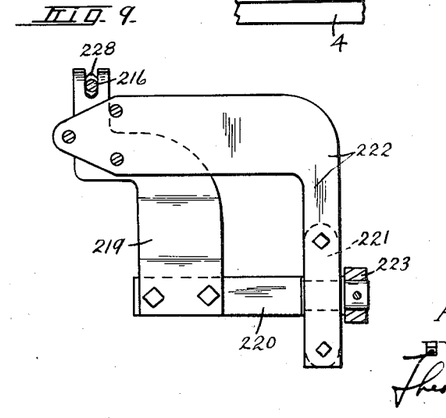
Figure 9 is a detail vertical sectional view taken substantially on line 9—9, Figure 8, illustrating a portion of the spoon blank brake release mechanism on an enlarged scale.

A spring 218 is mounted on the stem 216 between the plug 217 and the case 214 for yieldingly urging the case and brake shoe inwardly toward the guide recess 149. The outer end of the stem 216 extends some distance beyond the plug 217 and is slidably received in the bifurcated end of a rock lever 219. The lever 219 extends downwardly from the stem 216 and has the lower end thereof secured to a rock stud 220 which is journaled in a bearing 221 secured to an L-shaped bracket 222 which in turn is connected with the standard 136, as illustrated in Figures 9 and 11.

Figure 8:
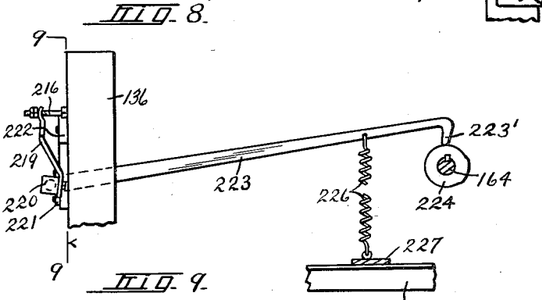

The stud 220 is secured at one end to an arm 223 which extends rearwardly from the standard 136 to a position over the cam shaft 164, as illustrated in Figure 8. The rear or free end of the arm 223 is provided with a pendent portion 223' providing a cam follower adapted to contact the peripheral surface of a cam 224 mounted on the cam shaft 164 at the end thereof opposite the drive gear 191, as illustrated in Figure 2. The cam follower 223' is maintained in cooperative relation with the cam 224 by a spring 226 connected with the arm 223 and with a plate 227 secured to the cross bars 4 of the frame 1, as illustrated in Figures 1 and 2. The arrangement of the cam 224 and arm 223 is such that the lever 219 is yieldingly urged inwardly toward the standard 136 by the spring 226 and positively moved outwardly away from said standard by the action of the cam 224. For this purpose the stem 216 is provided with nuts 228 screw-threaded on the outer end of the stem to be engaged by the upper end of the lever 219.

This machine may, as shown more particularly in Figures 1 and 6, be provided with a branding or stamping mechanism 230 for inscribing a suitable token or insignia on the spoon blanks. This branding mechanism 230 comprises an electric heating element 231 adapted to extend through the slot 158 and which carries the desired token or insignia. This heating element is secured to a flanged sleeve 232 in insulated spaced relation thereto said sleeve being screw-threaded on the forward end of a reciprocating arm 233. The arm 233 is hingedly connected with the housing member 105 by means of two pairs of parallel links 234 pivotally connected to said arm.

A spring 235 is connected at one end to the link of the rearwardly positioned pair adjacent the pivotal connection thereof with the housing 105, the other end of the spring being connected to the forwardly positioned pair of links adjacent the pivotal connection thereof with the arm 233 for urging the arm 233 rearwardly and holding a cam follower 236 carried by said arm in contact with a cam 237 mounted on the cam shaft 164, as shown in Figures 2 and 6.

The cam follower 236, in this instance, is mounted on the lower end of a vertically disposed rock arm 238 which is pivotally connected intermediate its ends, as at 239, to the rear end of the arm 233. The other end of the rock arm 238 is mounted between a spring 240 and a stop screw 241 carried by an extension 233' of the arm 233. The spring 240 is arranged to maintain the upper end of the arm 238 in yielding contact with the stop screw 241 during the normal operation of the arm 233 for bringing the heating element into engagement with the spoon blank under yielding pressure.

The tension of the spring 240 is controlled by an adjusting screw 242 mounted in the arm extension 233 at the rear of the spring 240. The branding mechanism, as shown, is mounted to engage the lower end portion of the handle of the spoon blank when said blank is maintained in the intermediate position in its movement along the guide recess 149. It will be evident, however, that the branding mechanism may readily be positioned to engage other portions of the spoon blank if desired.

In operation the spoon blanks which, as hereinbefore stated, are in a more or less swollen condition due to the action of water, steam or other moistening means thereon, are manually stacked in the chute or magazine 134 between the head 200 of the plunger 199 and the feed rollers 176. As the machine is set into operation by rotation of the drive pulley 28, the feed rollers 176 urge the spoon blanks forwardly through the chute or magazine until the foremost blank contacts with the adjacent portion of the feed plate 151. During the initial upward movement of the feed slide 150, the spoon blank will be engaged by seat 154 and be carried upwardly with the slide through the rear or narrow portion of the guide recess 149. During this upward movement of the feed slide the latch 207 will register in the slot 155 of the feed plate 151 until said latch is engaged by the upper end of the spoon blank whereupon the latch will be forced outwardly against the action of spring 210, thus permitting the spoon blank to pass upwardly beyond the latch. As the feed slide approaches its extreme upward position, the spoon blank will pass beyond the latch 207 and permit the latch to be moved forwardly by the spring 210 to bring it into the feed slide channel 153 below the spoon blank. During this upward movement of the feed slide and spoon blank, the brake shoe 215 will be forced outwardly against the action of the spring 218 by cam 224 and lever 219 until the feed slide approaches the end of its upward stroke when the brake is released. As the brake is released, spring 218 urges the brake shoe inwardly so that it presses the blank firmly against the upper portion of the slide plate 151 and holds the blank on seat 154. As the feed slide 150 begins its return or downward movement, the latch 207 will be in the path of movement of the spoon blank and hold said blank in an intermediate raised position against being moved downwardly by the feed slide.

As soon as the upper portion of the plate 151 passes below the spoon blank, the blank will be pressed from the narrow portion of the guide recess 149 into the head or wider portion thereof by the action of the spring 218 upon the brake shoe 215 and by the engagement of the end 206' of head 206 with the handle portion of the blank. In other words, the brake and retaining head coact to bring the spoon blank into alignment with the plate portion 151 of the feed slide. As the feed slide approaches its lowermost position, the feed rollers 176 will again force a succeeding spoon blank contained in the chute or magazine 134 into engagement with the upper portion of the feed plate 151 with the lower end of the blank in position to be engaged by the seat 154 as the feed slide is again moved upwardly.

During the initial portion of the second upward movement of the feed slide the lower end of the first spoon blank will be caused to pass through the throat portion 156' of the recess 156 into said recess due to the blank being frictionally maintained against upward movement by the brake shoe 215. After the first spoon blank has been received in the recess 156 the brake shoe is moved outwardly by cam 224 and lever 219 to release the blank which is then carried upwardly or forwardly of the feed slide and into a die member 80 registering with the upper end of the feed slide recess 149. This die member, as hereinbefore explained, will be in the open position in registration with the recess 95 of the keeper 92.

It will be understood that during the upward movement of the first spoon blank the second spoon blank will be moved upwardly about the latch 207 in the manner hereinbefore described for the first spoon blank so as to be retained in an intermediate position in the feed slide recess as the feed slide again returns to its lowermost position. Just prior to the feed slide commencing its return downward movement the die closing mechanism 104 will be actuated to effect closing of the die 80 in registration with the feed slide recess. During the initial closing operation of the die 80 the bowl portion of the spoon blank will be first engaged by the adjacent portion of the male die section 83 which will press the spoon blank tightly against the female die and maintain said blank against downward movement during the initial downward movement of the feed slide and thereby cause the lower end of the spoon blank to be withdrawn from the recess 156 of the feed slide.

Simultaneusly with the closing of the die 80, the jaws 127 of the blank compression unit 126 will be moved into pressure engagement with the marginal edge of the bowl portion of the spoon blank by the engagement of the cam arms 132 with said jaw members for compressing the bowl portion of the spoon from its swollen or expanded position as indicated by broken lines in Figure 19, to substantially its normal contracted position before being treated with water, steam or other moistening agent, as indicated by full lines in Figure 19. This compression of the bowl portion of the spoon blank is preferably accomplished during the initial closing operation of the die member, that is, during the initial lateral bending of the bowl portion of the spoon blank, as indicated in Figure 22, or before the molding of the spoon blank is fully completed, as illustrated in Figure 21. The pressure thus applied to the edge of the bowl contracts said bowl portion of the spoon blank simultaneously with the lateral bending of said portion and produces a spoon bowl of concavo-convex form without causing undue stretching stresses thereon.

It will be understood that the oven 10 will have been heated to the desired temperature prior to the insertion of a spoon blank into a die 80 mounted on the carrier 72. The temperature usually maintained in the oven 10 during the operation of the machine by the heating elements 19 has heretofore been approximately 400° F. This temperature of the oven may be determined by the use of a suitable thermometer T inserted in the oven, as indicated in Figure 6.

The spoon blanks normally contain from ten to twelve percent. moisture and, after they have been conditioned by the moistening agent, contain from seventeen to twenty percent. moisture. The relatively high degree of temperature maintained in the oven 10 heats the dies accordingly, with the result that most of the moisture carried by the spoon blanks is extracted therefrom during the movement of the blanks and dies from the feeding to the discharge positions so that as the blanks are ejected from the oven 10 they contain only four or five percent. moisture. It is thus seen that the blanks, as they leave the oven, are in a dryer state than before being treated with the moistening agent. This high percentage of moisture dispelled from each spoon blank is due primarily to the peculiar manner in which the die closing mechanism and the die keepers act upon the dies so that steam formed by the high temperature maintained in the oven 10 may readily escape from the blanks particularly at the central portions thereof clamped between the die sections 81 and 83. It will be noted that although each blank is subjected to high pressure by the die sections as said sections are closed by the die closing mechanism 104, shrinkage of each blank as it dries gradually reduces the pressure contact of the die sections therewith. This is due to the action of the die closing mechanism 104 upon each die being discontinued as soon as the die is closed and to the fact each die section 83 is maintained against outward opening movement only by its keeper 92. In other words, each keeper 92 does not function to move the section 83 inwardly as the blank shrinks so that steam formed in each spoon blank adjacent the central portion of the die sections readily escapes into the oven as the pressure contact of said die sections with the spoon blank decreases. Furthermore, it will be noted that there is little or no shrinkage or contraction of the bowls produced by the heat in the oven 10 after said bowls have been engaged by the jaw members 127 and male and female dies 81 and 83. These two features practically eliminate checking and splitting of the bowls as the wood becomes thoroughly dry during the passage of the blanks through the oven 10 from the inlet to the outlet openings, so that the percentage of waste of the finished spoons from checking and splitting is reduced to a minimum.

The moisture carried by the spoon blanks is turned to steam or vapor by the engagement of the dies therewith. This steam or vapor escapes from the oven chamber 21 through an opening 245 provided in the wall of the oven at the uppermost part thereof. A curved baffle plate 246 may, as shown in Figure 24, be supported by the cross rod 3 to extend over the opening 245 for preventing condensation which otherwise would collect on the cross rod from returning through opening 245 to the oven chamber 10'.

During the cycles of movement of the feed slide 150, the die carrier 72 will be intermittently rotated by the action of the pawl 38 upon the ratchet wheel 37 to bring successive die members 80 into registration with the upper end of the feed slide recess 149 for loading the die members. As the loaded die members approach the end of a complete revolution, the keeper members 92 will be successively actuated by the engagement of the pins 97 with the cam 98 for releasing the die carrying arms 85 and permit said arms and the male die sections 83 carried thereby to swing outwardly away from the female die sections 81 by the action of springs 89 and plungers 87. This outward movement of each die section releases the formed spoon S carried thereby and permits the same to pass from the interior of the oven 10 through the opening 99 whereupon it may be deposited in a suitable receptacle therefor in any suitable manner, as on to a chute (not shown).

It will now be understood that inasmuch as each keeper member 92 will be maintained in the position illustrated in Figure 16 of the drawings after having been rocked by the coaction of the pin 97 and cam 98 to release the die carrying arm 85, said keeper will be maintained in said position by the engagement of the arm in the recess 85 and action of plunger 87 on said arm against the action of the corresponding spring 100. However, as soon as the arm 85 is moved toward the female die section 81 by the die closing mechanism 104, the spring 100 will rock said keeper about the pin 93 as soon as the arm 85 moves out of the recess 95 to bring the cam surface 96 into contact with the lower end of the arm. This cam surface being arranged eccentric to the pin 93 will automatically lock the arm 85 in the innermost position thereof as produced by the die closing mechanism 104 irrespective of any variations in the thickness of the spoon blanks or in the position of the lower end of the arm 85 as a result thereof.

The branding or stamping mechanism 230 is so constructed and intermittently operated that the same will be brought into operative engagement with the spoon blanks when said spoon blanks are being maintained in their intermediate position in the feed slide recess by the latch 207 after the feed slide 150 has been returned to its lowermost position.

It will be obvious that the machine may continuously operate for molding successive spoon blanks so long as blanks are maintained in the chute or magazine 134 between the feed rollers 176 and the feed slide 150.

Although I have shown and particularly described the preferred embodiment of my invention, I do not wish to be limited to the exact construction shown, as various changes both in the form and relation of parts thereof may readily be made without departing from the spirit of the invention as set forth in the appended claims.

I claim:

1. In a machine for molding spoons or the like, a support, a spoon mold mounted on said support, said mold including male and female die sections engageable with opposite sides of at least a portion of the spoon blank, clamping elements arranged in predetermined relation with the male and female die sections for engaging opposite edges of said spoon blank portion, means for producing relative movement of the die sections toward each other to bring them into pressure engagement with the spoon blanks, and means associated with one of said die sections and actuated by said relative movement of said sections for moving the clamping elements into pressure engagement with said edges of the spoon blank.

2. In a molding machine of the class described, a support, a sectional die member on said support adapted to receive spoon blanks or the like therein, said die member including a relatively fixed die section and a movable die section movable toward and from the fixed die section for opening and closing the die, a keeper member rotatably connected with the support and having a cam surface movable into and out of holding relation with the movable die section for releasably maintaining said section in a closed position, means including a spring connected with said keeper for yieldingly urging said cam surface into said holding engagement with the die section, means for moving said keeper against the action of the spring to bring the cam surface thereof out of holding engagement with said movable die section, and separate means for moving the die section to the open position, said keeper and movable die section having cooperating holding elements brought into engagement with each other when said die section is in the open position for releasably holding the keeper against the action of the spring with the cam surface thereof in an inoperative position.

3. In a blank molding machine of the character described having a mold adapted to receive a blank therein, in combination, means for feeding a blank to the mold comprising a reciprocating feed slide having a blank receiving seat intermediate its ends, means for reciprocating said slide to bring the blank seat from a blank-receiving position to a position intermediate said receiving position and said mold, means for temporarily maintaining the blank in said intermediate position during the return movement of the slide, and means for marking said blank when in said intermediate position.

4. In a blank molding machine of the character described having a mold adapted to receive a blank therein, in combination, means for successively feeding the blanks to the mold comprising a feed slide having a pair of blank engaging elements arranged in spaced relation to each other longitudinally of the slide, means for reciprocating said slide to bring one of the blank engaging elements from a blank-receiving position to an intermediate position and to bring the second one of said blank engaging elements from said intermediate position to a position adjacent said mold for moving the blank from the intermediate position into said mold, and means for marking the blank when said blank is in said intermediate position.

5. A structure as defined in claim 4 wherein the blank engaging elements are arranged in spaced relation to each other transversely of the reciprocative movement of the slide, and means adapted to engage the blank when in said intermediate position for moving the same from the path of movement of the first mentioned blank engaging element into the path of movement of the second mentioned blank engaging element.

6. In a blank molding machine of the character described having a mold adapted to receive a blank therein, in combination, means for successively feeding blanks to the mold comprising a feed slide having a pair of blank engaging elements arranged in spaced relation to each other longitudinally of the slide and transversely of the reciprocative movement of said slide, means for reciprocating the slide to bring one of said blank engaging elements from a blank-receiving position to an intermediate position to bring a blank to said intermediate position and to move the second one of said blank engaging elements from the intermediate position to a position adjacent said mold for moving a blank from said intermediate position into said mold, means including a yieldingly operated latch movable into the path of movement of the blank to engage the rear end thereof for maintaining said blank in said intermediate position, a brake element spaced from said latch and engageable with the blank intermediate the ends thereof for moving said blank laterally with respect to the latch from a position in the path of movement of said first mentioned blank engaging element into the path of movement of said second mentioned blank engaging element, means for actuating said brake element to release the blank after said blank is engaged by said second mentioned blank engaging element, and means for marking said blank prior to said operation of the brake element.

7. In an apparatus of the character described having a mold adapted to receive thin wooden blanks therein, in combination, a chute adapted to receive said blanks stacked in side by side relationship, a feed slide arranged substantially normal to the direction of movement of the blanks in said chute, a guideway for said slide, means for reciprocating said slide to deliver a blank from said chute to said mold, and means for feeding the blanks under yielding pressure along said chute and into said guideway in position to be engaged by said slide during the reciprocative movement thereof, said feeding means comprising a pair of rotating resilient wheels arranged at opposite sides of said chute in position to engage the sides of said blanks, whereby said blanks are crowded together so as to maintain them in a flat condition.

8. In a blank molding machine of the character described having a mold adapted to receive a blank therein, in combination, means for successively feeding the blanks to the mold comprising a feed slide having a pair of blank engaging elements arranged in spaced relation to each other longitudinally of said slide, said blank engaging elements being also arranged in spaced relation to each other transversely of the slide, means for reciprocating said slide to bring one of the blank engaging elements from a blank receiving position remote from the mold to a position intermediate said blank receiving position and said mold and to bring the second one of said blank receiving elements from said intermediate position to a position adjacent said mold for moving a blank from the receiving position into said mold, and means adapted to engage the blank when in said intermediate position for moving the same from the path of movement of the first mentioned blank engaging element into the path of movement of the second blank engaging element.

9. In a spoon molding machine of the character described, a rotatable carrier having a series of sectional molds mounted thereon, a single power operated mold closing means disposed adjacent the path of the molds for successively closing the molds, a plurality of keeper elements one for each mold mounted on the carrier for holding the molds in the closed position, a single keeper actuating means arranged in the path of the keeper elements in predetermined relation to the mold closing means adapted to successively cause said keeper elements to move out of holding relation with the molds to release said mold sections, and separate means mounted on the carrier adapted to actuate the released mold sections to open said molds.

10. In a spoon molding machine of the character described, a rotatable carrier having a series of sectional molds mounted thereon, spring means associated with the sections of each mold normally urging the molds to the open position, a single power operated mold closing means disposed adjacent the path of the molds for successively closing the molds against the action of said spring means, a plurality of spring actuated keeper elements one for each mold mounted on the carrier and functioning independently of the mold closing means for holding said molds in the closed position against the action of the mold opening means, and a single keeper actuating means arranged in the path of the keeper elements in predetermined relation to the mold closing means adapted to successively cause said keeper elements to move out of holding relation with the molds.

11. In a machine for molding spoons from thin wooden blanks, a rotatable carrier having a series of spoon molds mounted thereon, each of said molds having two sets of relatively movable side and edge forming means engaging opposite sides and edges respectively of a portion of the spoon blank for forming the spoon bowl, a single power operated mold closing means disposed adjacent the path of the molds for successively closing one of the forming means of the molds, means actuated by said mold closing means for closing the other one of said forming means of the molds, a plurality of keeper elements one for each mold mounted on the carrier for holding the molds in the closed position, a single keeper actuating means arranged in the path of the keeper elements in predetermined relation to the power operated mold closing means adapted to successively cause said keeper elements to move out of holding relation with the molds to release said relatively movable side and edge forming means, and separate means supported by the carrier adapted to actuate said released side and edge forming means to open said molds.

12. In a molding machine for forming wooden blanks into predetermined arcuate form, a mold comprising male and female die sections having relative movement toward and from each other to receive a blank between them and to press said blank into said arcuate form, a pair of clamping members mounted on one of the die sections to move with respect thereto and to each other in a direction substantially normal to the direction of said relative movement of the die sections for receiving the blank between them and for compressing said blank, means for operating said die sections, and separate means for operating the clamping members including cam elements carried by the other die section arranged to have engagement with said clamping members, said cam elements being rendered effective by said relative movement of the die sections for actuating said clamping members.

13. In a wooden spoon molding machine, a support, a spoon mold including male and female die sections carried by said support, at least one of said die sections having movement with respect to the other die section for opening and closing the mold, a reciprocating plunger separate from said mold and movable into and out of operative engagement with one of said die sections for closing the mold, and power driven means for actuating said plunger and cooperating with the support to effect closing of the mold under relatively high pressure and including an operating element having a positive predetermined action.

14. In a wooden spoon molding machine, a movable support, a plurality of spoon molds mounted on said support, each of said molds comprising a movable die section, means for moving said support to bring the spoon molds successively to a loading station, and means located adjacent the loading station for closing said molds, said closing means including a positively driven yielding plunger engageable with the movable die section of a mold only when said mold is at said loading station.

15. In a machine for molding spoons or the like, a support, a sectional die member mounted on said support, one of the sections of said die member being movable relative to another section to open and close the die, means independent of said sectional die member for producing movement of said movable die section to close the die, and separate means including a keeper element associated with the support and having a holding surface operatively engageable with the movable die section for maintaining said die section in the closed position.

16. In a machine for molding spoons or the like, a support, a sectional die member mounted on said support having a fixed die section and a movable die section movable with respect to said fixed section to open and close the die, die closing means including an actuating element temporarily engageable with the movable die section for closing said die member, and a cam member rotatably connected with the fixed die section operatively engageable with the movable die section during rotation of said cam and functioning independently of said die closing means for maintaining the die member closed.

17. A machine as defined in claim 16 having resilient means operatively associated with said cam member for yieldingly urging the cam member into said engagement with the movable die section.

18. In a wooden spoon molding machine of the class described, a movable carrier, a sectional spoon mold mounted on said carrier having at least one of the sections thereof movable with respect to the carrier to open and close the mold, means for moving said carrier to bring the mold into and out of a loading station, power means positioned at said loading station including a positively driven actuating element temporarily engageable with said movable mold section for closing the mold, keeper means mounted on the carrier to move therewith having a holding surface engageable with the movable mold section, means actuating said keeper means to maintain said mold closed, means spaced from the carrier and arranged in predetermined spaced relation to the loading station for actuating the keeper means to release said mold section, and separate means on the carrier acting on said movable mold section when released for opening said mold.

19. In a molding machine of the class described, a support, a sectional die member on said support adapted to receive spoon blanks or the like therein, said die member including a die section movable for opening and closing the die, a spring actuated keeper member rotatably connected with the support and having a cam surface movable into and out of holding relation with the movable die section for releasably maintaining said section in the closed position, means for moving said keeper against the action of the spring to release said movable die section, and actuating means for moving the released die section to the open position, said keeper and movable die section having two sets of cooperating holding elements, the holding elements of one of said sets being brought into engagement with each other when said die section is in the open position, for releasably holding the keeper against the action of the spring with the cam surface thereof in an inoperative position, and the holding elements of the second set being adapted to cooperate for releasably maintaining the movable die section in a predetermined open position against the operation of said actuating means.

20. In a molding machine for producing an article of curved configuration from a substantially flat blank composed of wood or analogous material, in combination, male and female die sections mounted to receive the blank between them, operating means for producing relative movement of the die sections toward and from each other to bring them into and out of operative engagement with opposite side surfaces of the blank, a pair of spaced clamping elements mounted adjacent the die sections to receive the blank between them simultaneous with said die sections and to engage opposite edge surfaces of said blank, and additional operating means located on a movable one of said die sections and extending in advance of said section so as to operate prior to the end of the relative movement of the die sections toward each other to produce relative movement of the clamping elements toward each other into engagement with said opposite edge surfaces of the blank with sufficient force to move said latter surfaces inwardly toward each other.

21. In a molding machine for producing an article of curved configuration from a substantially flat blank composed of wood or analogous material that has been swollen by moisture, in combination, male and female die sections mounted to receive the blank between them, operating means for producing relative movement of the die sections toward and from each other to bring them into and out of operative engagement with opposite side surfaces of the blank, a pair of spaced clamping elements mounted adjacent the die sections to receive the blank between them simultaneous with said die sections and to engage opposite edge surfaces of said blank, and additional operating means located on a movable one of said die sections and extending in advance of said section so as to operate prior to the end of the relative movement of the die sections toward each other to produce relative movement of the clamping elements toward each other into engagement with said opposite edge surfaces of the blank, said latter operating means including cam members having a definite action on said clamping elements so that said latter surfaces are returned to substantially their normal spaced relation which existed prior to said swelling of said blank.

22. The method of forming a spoon having a handle and a bowl from a substantially flat wooden blank having a handle portion and a bowl portion which comprises rendering the blank pliable by impregnation with moisture, bending the blank to the desired spoon shape, constraining the blank in the bent shape while exerting pressure over the surface of the blank, subjecting the constrained blank to heat to drive out the moisture therefrom, and substantially reducing the pressure as the moisture is driven off.

23. The method of forming a spoon having a handle and a bowl from a substantially flat wooden blank having a handle portion and a bowl portion which comprises impregnating the blank with an excess of moisture to render the blank pliable, placing the blank between a pair of cooperative forming elements, forcing said forming elements toward one another to bend said blank to the desired spoon shape, holding said forming elements under pressure while heating said blank to drive off said excess moisture, and substantially reducing said pressure as said excess moisture is driven off.

24. The method of forming a wooden spoon having a handle and a bowl from a substantially flat wooden blank having a handle portion and bowl portion which comprises impregnating said blank with an excess of moisture to render the blank pliable, laterally compressing the bowl portion of said blank, bending said blank to the desired spoon shape by the application of pressure over the surface of the blank while maintaining said lateral compression, and driving off the excess moisture from said blank while simultaneously substantially decreasing the lateral compression and the bending pressure as said moisture is driven off.

25. In a wooden spoon molding machine, a support, a spoon mold including male and female die sections carried by said support, one of said die sections being movable with respect to the other die section for opening and closing said mold, a reciprocable plunger movable independently of said mold and said support, said plunger being adapted to contact said movable die member to close said mold under pressure, and power driven plunger operating means including a positively driven member and yielding means between said member and said plunger.

26. In a wooden spoon molding machine, a movable support, a plurality of spoon molds mounted on said support, each of said molds comprising a movable die section, means for moving said support to bring the spoon molds successively to a loading station, and means located adjacent said loading station for closing said molds, said closing means including a plunger engageable with the movable die section of a mold only when said mold is at said loading station, positively driven means for actuating said plunger independently of said movable support, and yielding means between said actuating means and said plunger.

ARTHUR C. HOPKINS.